United States Patent
Bollengier et al.

(10) Patent No.: US 11,760,213 B2
(45) Date of Patent: Sep. 19, 2023

(54) RAILWAY VEHICLE EQUIPPED WITH AN ELECTRICAL STORAGE BODY

(71) Applicant: SpeedInnov, Paris (FR)

(72) Inventors: Christophe Bollengier, Sentheim (FR); Fabrice Hickenbick, Merxheim (FR); David Goeres, Le Mans (FR); Philippe Lavigne, Veretz (FR)

(73) Assignee: SpeedInnov, Paris (FR)

( * ) Notice: Subject to any disclaimer, the term of this patent is extended or adjusted under 35 U.S.C. 154(b) by 565 days.

(21) Appl. No.: 16/812,072

(22) Filed: Mar. 6, 2020

(65) Prior Publication Data
US 2020/0282837 A1   Sep. 10, 2020

(30) Foreign Application Priority Data

Mar. 6, 2019  (FR) ...................................... 19 02289

(51) Int. Cl.
*B60L 50/53*   (2019.01)
*B60L 5/00*   (2006.01)

(52) U.S. Cl.
CPC ............... *B60L 50/53* (2019.02); *B60L 5/00* (2013.01); *B60L 2200/26* (2013.01)

(58) Field of Classification Search
CPC .. B60L 1/00; B60L 1/003; B60L 1/006; B60L 5/00; B60L 50/00; B60L 50/50; B60L 50/51; B60L 50/52; B60L 50/53; B60L 53/20; B60L 53/22; B60L 50/66; B60L 55/00; B60L 2200/26; B60L 2200/30
See application file for complete search history.

(56) References Cited

U.S. PATENT DOCUMENTS 9,764,647 B2 *   9/2017  Matsuda ................... B60L 7/02
2020/0086744 A1*   3/2020  Schumacher ........... B60L 58/22

FOREIGN PATENT DOCUMENTS

| CN | 109383299 A | * | 2/2019 | ................ B60L 1/00 |
| CN | 109383299 A |   | 2/2019 |                          |
| CN | 109435974 A | * | 3/2019 | ................ B60L 1/00 |
| EP | 2570292 A1  |   | 3/2013 |                          |

(Continued)

OTHER PUBLICATIONS

French Search Report for Application No. 1902289, dated Nov. 21, 2019 in 2 pages.

*Primary Examiner* — Zachary L Kuhfuss
*Assistant Examiner* — Cheng Lin
(74) *Attorney, Agent, or Firm* — Knobbe, Martens, Olson & Bear, LLP

(57) ABSTRACT

This invention concerns a railway vehicle (10), including: a power supply device (20), an electrical traction engine (15), first electrical auxiliary equipment (16, 17), and a connector (22) for connecting to an electrical power source external to the vehicle. The power supply device comprises: an electrical converter (26) suited to supply the electrical traction engine with high-voltage current, wherein the electrical converter is connected to the connector; a first medium-voltage electricity network (34) to which the first auxiliary electrical equipment is connected, and a first electrical storage element (30) connected to the first medium-voltage electricity network so as to supply electricity to or draw electricity from the first network. The electrical converter is connected to the first medium-voltage electricity network so as to supply the first network with electricity.

7 Claims, 2 Drawing Sheets

(56) References Cited

FOREIGN PATENT DOCUMENTS

| | | | |
|---|---|---|---|
| EP | 3269581 A1 * | 1/2018 | .............. B60L 1/003 |
| EP | 3269581 A1 | 1/2018 | |
| WO | 2014008114 A2 | 1/2014 | |

* cited by examiner

RAILWAY VEHICLE EQUIPPED WITH AN ELECTRICAL STORAGE BODY

CROSS-REFERENCE TO RELATED APPLICATIONS

This application claims priority to French Patent Application No. FR 19 02289 filed on Mar. 6, 2019, the disclosure of which including the specification, the drawings, and the claims is hereby incorporated by reference in its entirety.

FIELD OF THE INVENTION

This invention concerns a railway vehicle of the type including a power supply device, an electrical traction motor, first auxiliary electrical equipment, and a connector connecting to an electrical power source external to the vehicle, wherein the power supply device comprises: an electrical converter suited to supply the electrical traction engine with high-voltage current, wherein the electrical converter is connected to the connector; a first medium-voltage electricity network to which the first auxiliary electrical equipment is connected, and a first electrical storage element connected to the first medium-voltage electricity network so as to supply electricity to or draw electricity from the first network.

BACKGROUND OF THE INVENTION

It is known to equip railway vehicles, in particular trains, with internal power storage elements. A vehicle as described above is described, for example, in document WO2014008114. The auxiliary equipment may thus be supplied by the internal elements or the external source, separately or simultaneously.

Auxiliary functions such as air conditioning of passenger carriages require significant electrical power. Supplying them via internal storage elements involves constraints and high costs for the vehicle's electrical power supply.

SUMMARY OF THE INVENTION

This invention seeks to solve this problem. To this end, the object of the invention is a railway vehicle as described above, wherein the electrical converter is connected to the first medium-voltage electricity network so as to supply the first network with electricity.

According to other advantageous aspects of the invention, the railway vehicle includes one or more of the following features, alone or in any combination technically possible:
- the power supply device comprises a first reversible charger interposed between the first electrical storage element and the first medium-voltage electricity network, wherein the first charger is suited to transfer electricity to one or the other of the first element and the first network;
- the first power storage element comprises at least one lithium ion battery;
- the railway vehicle further comprises second auxiliary equipment, and wherein the power supply device further comprises: a second low-voltage electricity network to which the second equipment is connected; and a second electrical storage element connected to the second low-voltage electricity network so as to supply electricity to or draw electricity from the second network; wherein the second storage element is also connected to the first medium-voltage electricity network so as to draw electricity from the first network;
- the power supply device comprises a second charger interposed between the first medium-voltage electricity network and the second storage element so as to supply the second element with electricity from the first network, wherein the second charger is also connected to the second low-voltage electricity network so as to supply the second network with electricity without passing through the second storage element;
- the second power storage element comprises at least one lithium ion battery.

The invention further concerns a method for operating a railway vehicle as described above.

According to a first aspect of the invention, the method is as follows: the electrical converter draws electricity from an electrical power source external to the vehicle via the connector, and supplies the first medium-voltage electricity network with electricity, and the first electrical storage element draws electricity from the first network.

According to second first aspect of the invention, the method is as follows: the electrical converter draws electricity from an electrical power source external to the vehicle via the connector, and supplies the electrical traction engine with electricity, and the first electrical storage element supplies the first medium-voltage electricity network with electricity.

According to a third aspect of the invention, the method is as follows: the first electrical storage element supplies the first medium-voltage electricity network with electricity, and the second electrical storage element draws electricity from the first network.

BRIEF DESCRIPTION OF THE DRAWINGS

The invention will be better understood based on the following description, which is provided by way of example only and without limitation, and by reference to the drawings, which show.

DETAILED DESCRIPTION OF THE PREFERRED EMBODIMENTS

Figure 1:
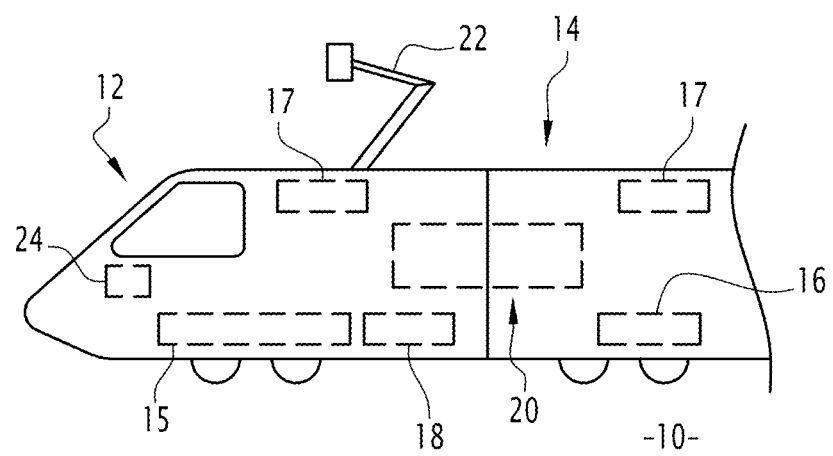
FIG. 1 is a schematic view of a railway vehicle according to one embodiment of the invention.

FIG. 1 is a schematic representation of a railway vehicle 10 according to one embodiment of the invention. The railway vehicle 10, e.g. a train, includes a motor 12 coupled to one or more carriages 14, intended, in particular, for use by passengers.

The railway vehicle 10 includes at least one electrical traction engine 15 equipping the motor. The engine 15 is intended, in particular, to operate under high voltage, in particular greater than 700 V.

Additionally, the railway vehicle 10 includes first auxiliary electrical equipment 16, 17 intended to operate on a 400 V medium-voltage network. The first electrical auxiliary equipment comprises, e.g., one or more compressors 16 intended to inflate a pneumatic circuit of the vehicle 10, air conditioning devices 17 for the carriages 14, or thermal equipment such as a cold room for preserving foodstuffs.

Additionally, the railway vehicle 10 includes second auxiliary electrical equipment 18 intended to operate on a 110V low-voltage network. The second auxiliary electrical equipment 18 comprises, e.g., lighting and/or ventilation devices for the carriages 14, or refrigerators.

The railway vehicle 10 additionally includes a power supply device 20 connected to the auxiliary electrical equipment 16, 17, 18. The device 20 is suited to cooperate with an electrical power source external to the vehicle. In the embodiment shown, the railway vehicle 10 includes a pantograph 22 suited to supply the device 20 with electricity from a catenary (not shown).

The railway vehicle 10 further includes an electronic control module 24 suited to control the device 20.

Figure 2:
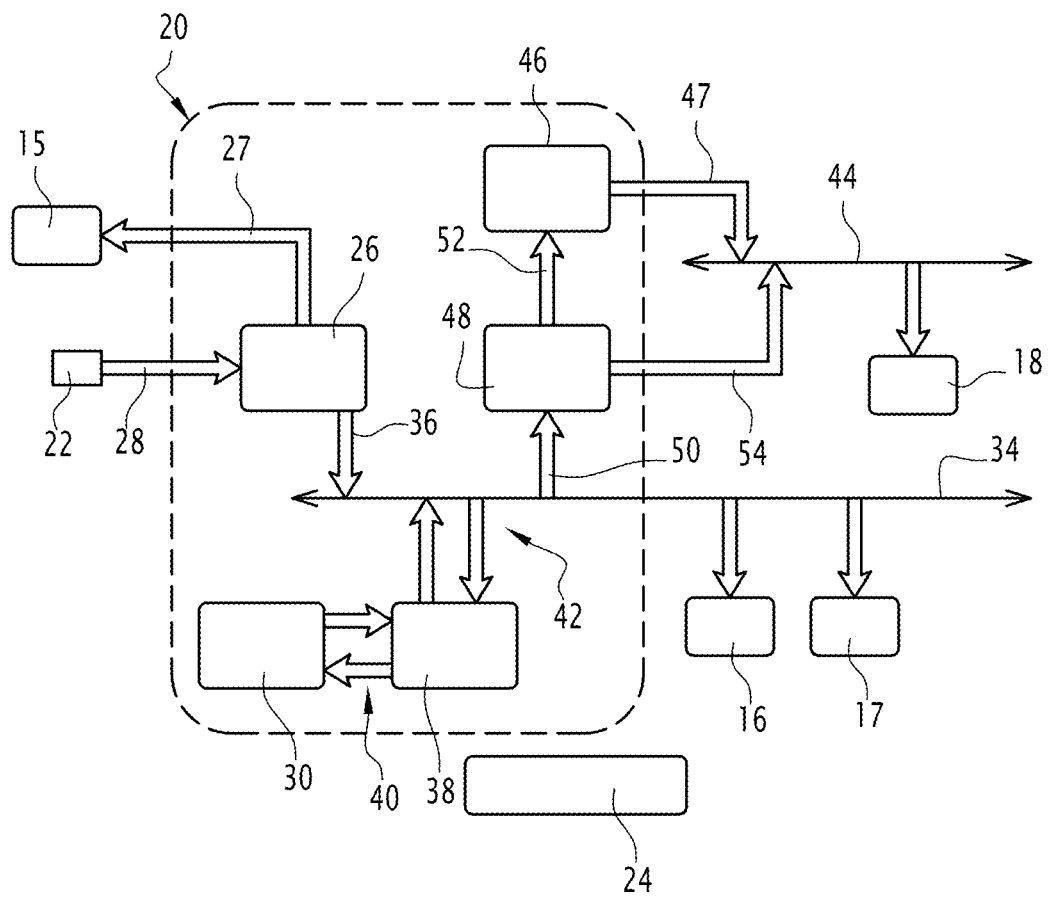
FIG. 2 is a schematic view of elements of the railway vehicle of FIG. 1.

FIG. 2 is a schematic representation of several elements of the railway vehicle 10, in particular the power supply device 20.

In particular, the device 20 includes an inverter-type electrical converter 26, a first input 28 of which is connected to the pantograph 22. The converter 26 is suited to supply the engine 15 with high-voltage current, in particular greater than 700 V, via a first output 27.

The device 20 also includes a first electrical storage element 30. Preferably, the first element 30 is a battery, and more preferably comprises at least one lithium ion battery. Preferably, the first element 30 has a large capacity, on the order of 200 kWh.

Indeed, the lithium ion batteries allow for significant capacities at limited volumes. They also offer a longer useful life than other technologies, such as NiCad or lead gel.

Preferably, the element 30 is intended to store energy for non-safety-related comfort devices such as an air-conditioning system.

The device 20 additionally includes a first medium-voltage electricity network 34 to which the first auxiliary electrical equipment 16, 17 is connected. The electrical converter 26 is suited to supply the first network 34 with medium-voltage current via a second output 36.

Additionally, the device 20 includes a first reversible charger 38. A first 40 and a second reversible connection 42 electrically connect the first charger 38 to the first storage element 30 and the first network 34, respectively. The first charger 38 is thus suited to transfer electricity reversibly between the first storage element 30 and the first network 34.

The device 20 additionally includes a second, low-voltage electricity network 44 to which the second auxiliary electrical equipment 18 is connected.

The device 20 additionally includes a second electrical storage element 46, comprising an output 47 connected to the second electricity network 44 so as to supply the network with electricity. Preferably, the second element 46 is a battery, and more preferably comprises at least one lithium ion battery.

Preferably, the element 46 is intended to store energy for safety-relevant devices, such as emergency lighting and/or radio that may be required by applicable regulations.

Additionally, the device 20 includes a second charger 48. One input 50 of the second charger 48 is connected to the first medium-voltage electricity network 34. A first 52 and a second output 54 of the second charger 48 are respectively connected to the second electrical storage element 46 and the second low-voltage electricity network 44.

The electronic control module 24, which is arranged, e.g., in a steering cabin of the engine 12, is electronically connected to at least some of the aforementioned elements of the device 20, as will be discussed below. Preferably, the electronic module 24 is connected to an on-train GSM network that allows it to receive up-to-date information on the rate for the electricity available via the catenary.

Now, methods for operating the railway vehicle 10 will be described. The electronic control module 24 is equipped, in particular, with programs suited to execute these methods.

First, we will consider a first method, referred to as 'normal operation'. This method is executed, in particular, when the information received by the electronic module 24 indicate a cost for the electricity available via the catenary that is below a predetermined threshold.

In the first method, the electrical converter 26 is supplied by the catenary via the pantograph 22 and the first input 28. The electrical converter 26 supplies the first medium-voltage electricity network 34 and the first auxiliary electrical equipment 16, 17. The first network 34 also supplies the second low-voltage electricity network 44 via the second charger 48 and the second output 54.

Furthermore, when the first 30 and/or second electrical storage element 46 are not completely charged, the first 40 and second reversible connections 42 of the first charger 38 and/or the first output 52 of the second charger 48 are configured to supply electricity from the first network 34 to the first 30 and/or second element 46.

Now, we will consider a second method, referred to as 'climate control emergency operation'. This second method is executed, in particular, when the vehicle 10 is immobilised on a section of a railway not equipped with a catenary or is immobilised following a failure of the catenary, in particularly in a hot, sunny environment.

In the second method, the reversible charger 38 is supplied by the first electrical storage element 30 via the connection 40. The electrical charger 38 supplies the first medium-voltage network 34 and the first auxiliary electrical equipment 16, 17, in particular the air-conditioning devices 17 of the carriages 14.

In fact, the power supply for air conditioning requires a significant amount of power, which the reversible charger 38 is capable of providing.

Furthermore, in the aforementioned second method, the second electricity network 44 is supplied by the second storage element 46. As needed, the second network 44 may also be partially supplied by the first network 34 via the second charger 48 and its second output 54.

Now, a third method, known as 'energy smoothing', will be considered. The third method is executed, in particular, when the information received by the electronic module 24 indicates that the mains electricity available via the catenary is billed at peak rates.

In the third method, the electrical converter 26 is supplied by the catenary via the pantograph 22, and supplies, e.g., the engine 15. Additionally, the first 40 and second reversible connection 42 of the first charger 38 are configured such that the first element 30 supplies power to the first medium-voltage electricity network 34 and the first auxiliary electrical equipment 16, 17. Thus, the electricity drawn by the pantograph 22 is primarily dedicated to the engine 15 in order to reduce the external power consumption of the vehicle 10.

Preferably, the electronic module 24 controls the output 36 of the converter 26 such that the first network 34 draws the electricity primarily from the first element 30, and, from the converter 26 on a non-priority basis as needed.

The first network 34 also supplies the second low-voltage electricity network 44 via the second charger 48 and the second output 54.

The element 30 is then recharged when the electricity is no longer at peak rates.

A fourth method, referred to as 'safety battery (element 46) recharging' outside of recharging areas. This fourth method is executed, in particular, when the vehicle 10 is stationary, in particular at a location without a catenary.

In the fourth method, the engine 15 is stopped, and the electrical converter 26 is not supplied with power. The first 40 and second reversible connections 42 of the first charger 38 are configured such that the first element 30 supplies power to the first medium-voltage electricity network 34.

In a first variant of the fourth method, when the second electrical storage element 46 is not fully charged, the first output 52 of the second charger 48 is configured so as to supply electricity from the first network 34 to the second element 46. This method avoids providing the second element 46 with a recharging station specifically for stationary operation.

In a second variant of the fourth method, the first network 34 supplies some of the first auxiliary electrical equipment 16, 17, e.g. a cold room for foodstuffs. The first network 34 may also supply the second network 44 and certain items of second auxiliary electrical equipment 18, e.g. refrigerators, via the second charger 48. This method allows for perishable foodstuffs to be preserved when the vehicle 10 is stationary, in particular in countries in which the element 22 is not permitted to be connected at night.

The aforementioned methods 1-4 may be executed successively by a single vehicle.

Thus, the railway vehicle according to the invention is more independent when no external power source is available. The railway vehicle also allows for a reduction in operating costs by storing electricity and restoring it based on real-time changes in rates.

What is claimed is:

1. A railway vehicle comprising a power supply device, an electrical traction engine, first electrical auxiliary equipment, second auxiliary electrical equipment, and a connector for connecting to an electrical power source external to the vehicle,
wherein the power supply device comprises:
an electrical converter connected to the connector, the electrical converter comprising a first output connected to the electrical traction engine, so as to be suited to supply the electrical traction engine with high-voltage current;
a first medium-voltage electricity network to which the first auxiliary electrical equipment is connected;
a first electrical storage element connected to the first medium-voltage electricity network so as to supply electricity to or draw electricity from the first medium-voltage electricity network;
a second low-voltage electricity network to which the second equipment is connected; and
a second electrical storage element connected to the second low-voltage electricity network so as to supply electricity to or draw electricity from the second low-voltage electricity network;
wherein the electrical converter comprises a second output connected to the first medium-voltage electricity network, so as to be suited to supply the first medium-voltage electricity network with medium-voltage current; and
wherein the power supply device comprises a first reversible charger interposed between the first electrical storage element and the first medium-voltage electricity network, wherein the first reversible charger is suited to transfer electricity from the first electrical storage element to the first medium-voltage electricity network and from the first medium-voltage electricity network to the first electrical storage element; and
wherein the second electrical storage element is also connected to the first medium-voltage electricity network so that the first medium-voltage electricity network supplies electricity to said second electrical storage element.

2. The railway vehicle according to claim 1, wherein the first electrical storage element comprises at least one lithium ion battery.

3. The railway vehicle according to claim 1, wherein the power supply device comprises a second charger interposed between the first medium-voltage electricity network and the second electrical storage element so as to supply the second electrical storage element with electricity from the first medium-voltage electricity network, wherein the second charger is also connected to the second low-voltage electricity network so as to supply the second low-voltage electricity network with electricity without passing through the second electrical storage element.

4. The railway vehicle according to claim 1, wherein the second electrical storage element comprises at least one lithium ion battery.

5. A method for the operation of a railway vehicle according to claim 1, wherein:
the electrical converter draws electricity from an electrical power source external to the vehicle via the connector, and supplies the first medium-voltage electricity network with medium-voltage current, and
the first electrical storage element draws electricity from the first medium-voltage electricity network.

6. The method for the operation of a railway vehicle according to claim 1, wherein:
the electrical converter draws electricity from an electrical power source external to the vehicle via the connector, and supplies the electrical traction engine with high-voltage current, and
the first electrical storage element supplies the first medium-voltage electricity network with electricity.

7. The method for the operation of a railway vehicle according to claim 1, wherein:
the first electrical storage element supplies the first medium-voltage electricity network with electricity; and
the first medium-voltage electricity network supplies the second electrical storage element with electricity.

* * * * *